UNITED STATES PATENT OFFICE.

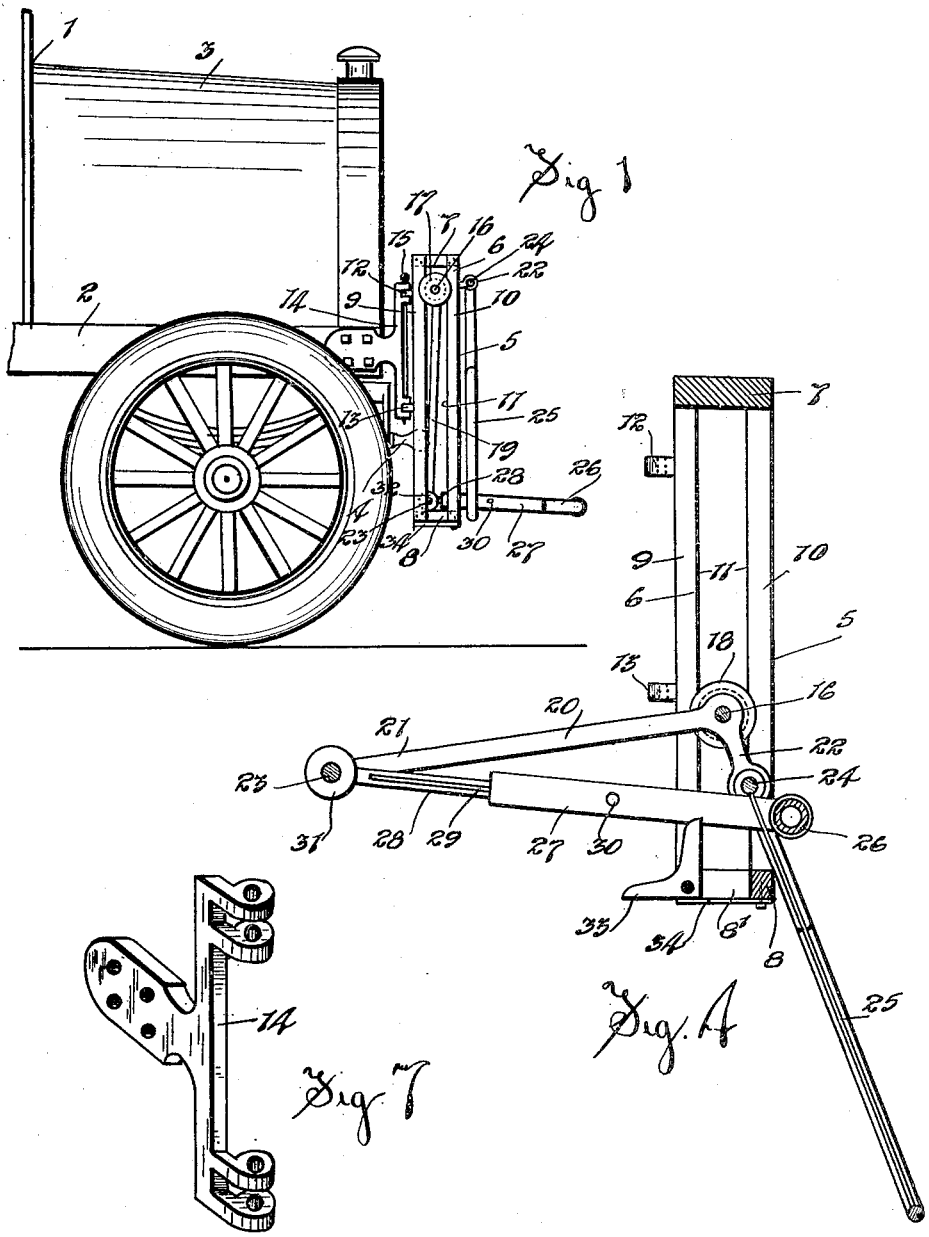

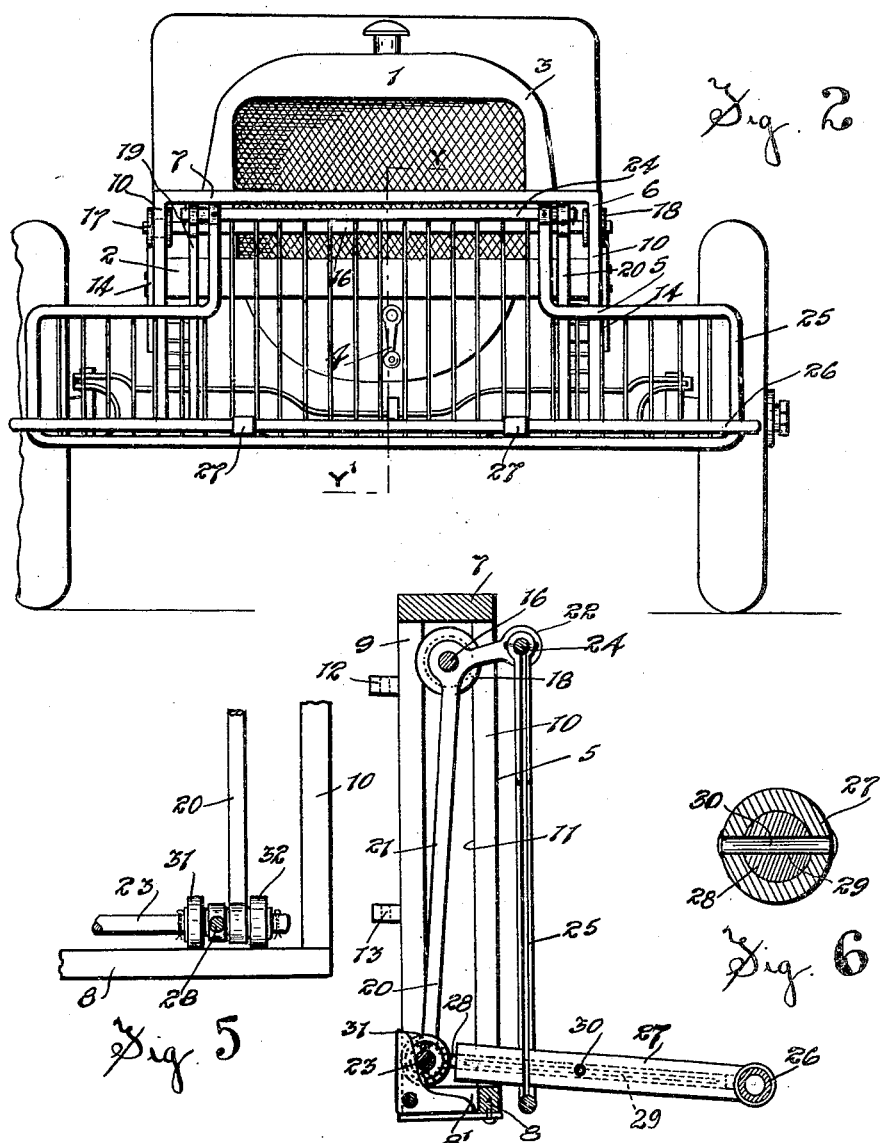

JACOB KWIATKOWSKI, OF WINNIPEG, MANITOBA, CANADA.

AUTOMOBILE-FENDER.

1,131,716.  Specification of Letters Patent.  Patented Mar. 16, 1915.

Application filed May 4, 1914. Serial No. 836,272.

*To all whom it may concern:*

Be it known that I, JACOB KWIATKOWSKI, of the city of Winnipeg, in the Province of Manitoba, Canada, have invented certain new and useful Improvements in Automobile-Fenders, of which the following is the specification.

The invention relates to improvements in fenders for automobiles and the object of the invention is to provide an inexpensive, easily constructed and applied fender which when placed on the front of an automobile and struck by an obstruction will drop toward the ground and effectively prevent the engaging object from passing beneath the automobile or under the wheels thereof.

With the above object in view the invention consists essentially in a substantially rectangular framework attached to the front of the automobile and presenting vertical guide ways, a main cross shaft carrying rollers operating in the guides, a pair of hangers in the nature of bell cranks mounted on the cross shaft, auxiliary cross shafts connecting the ends of the hangers, a guard fender carried by one of the auxiliary shafts, an actuating fender connected to the other of the auxiliary shafts and a releasing catch carried by the frame and engageable with one of the auxiliary shafts, the parts being arranged and constructed as hereinafter more particularly described and later pointed out in the appended claims.

Figure 1 represents a side view of the device as it appears on an automobile. Fig. 2 represents a front view of the same. Fig. 3 represents an enlarged detailed vertical sectional view centrally through the framework, the fenders being shown in set or up position. Fig. 4 represents a vertical sectional view similar to that shown in Fig. 3 with the exception that the parts appear in the actuated or lower position. Fig. 5 represents a front view of one of the counter shafts and adjoining parts. Fig. 6 is an enlarged detailed vertical sectional view through the actuating fender. Fig. 7 is an enlarged detailed perspective view of one of the supporting brackets.

In the drawings like characters of reference indicate corresponding parts in each figure.

1 represents the usual automobile of which 2 is the chassis, 3 the radiator and 4 the usual crank.

5 represents my fender which is now described in detail: It comprises an open substantially rectangular frame 6 comprising upper and lower cross members 7 and 8 connected by spaced end uprights 9 and 10, the parts forming vertical guide-ways 11 for a purpose later explained. The frame is formed with pairs of lugs 12 and 13 which are arranged to be received between other pairs of lugs formed on brackets 14 permanently secured in any suitable way to the frame or chassis. The lugs of the frame and brackets are connected at each side by vertically disposed pivot rods 15. This construction allows the framework and attached parts to be swung to the side by withdrawing one or other of the pivot rods and swinging the frame bodily on the pivot formed by the other of the rods, as will readily be understood. This swinging to the side is necessary in order to allow one to crank the machine in the usual way.

Although I have described a special means connecting the framework to the chassis, I do not wish to be restricted in any way to the special construction shown, as various other arrangements could be readily suggested and applied to equal advantage.

16 is a main cross shaft extending across the frame and provided with a pair of end rollers 17 and 18 operating within the guide ways of the frame.

19 and 20 represent a pair of similar hangers pivotally mounted on the main cross shaft 16 and in the nature of bell cranks having long and short arms 21 and 22. The long arms carry an auxiliary shaft 23 while the short arms are fitted with a further auxiliary shaft 24. The auxiliary shaft 24 carries a guard fender 25 of any suitable design.

26 is an actuating fender in the form of a tubular striking bar fitted with a pair of rearwardly extending tubes 27, the tubes receiving slidably the forward ends of a pair of rods 28 having their rear ends connected to the auxiliary shaft 23. The rods are slotted, as indicated at 29, and the slots receive cross pins 30 carried by the tubes.

The pins operating in the slot prevent the actuating fender from being withdrawn forwardly off the rods.

31 and 32 represent a pair of rollers mounted on the ends of the auxiliary shaft 23 immediately adjoining the rear ends of the rods 28 and the lower or long ends of the hangers. In the actual design of the device the rollers 31 and 32 are arranged to ride on the upper face of the cross member 8 when the rollers 17 and 18 are practically at the upper ends of the guides, and the guard fender is constructed, in the latter position of the last mentioned parts, such that it hangs in front of the framework with the lower edge thereof more or less directly in advance of the lower cross member 8. The tubes of the actuating fender are at this time resting on the cross member 8 and the rods are fully telescoped within the tubes. This position of the parts is shown in Fig. 3 of the drawings, and in order to retain them in the position shown, I have provided a more or less L-shaped pivoted catch piece 33 operating within a slot 8' formed in the cross member 8 and restrained in its movement by the action of a flat spring 34. In the position shown in Fig. 3 of the drawings, the spring is designed so that it is strong enough to prevent the catch from turning over under the action of the guard fender, which, it will be observed, has a natural tendency owing to its weight to swing the hangers rearwardly.

With the device applied on the front of an automobile with the parts set or in the position as shown in Figs. 1, 2 and 3 of the drawings, it will be seen that if an object is struck by the actuating fender, the actuating fender will be forced back by the object in the advancement of the car, and in passing back, will carry with it the auxiliary shaft 23 and turn back the catch piece 33. The instant the catch is released the auxiliary shaft 23 is freed, with the result that the guard fender drops bodily and assumes the position shown in Fig. 4. In this position, it will be observed that the rollers 17 and 18 have traveled down the guides and that the rods 28 have withdrawn from the tubes.

With the guard fender in the dropped or lower position it is impossible for the object to pass beneath the automobile or under the wheels.

To reset the fender, it is only necessary to catch hold of the actuating fender and pull it forward until the auxiliary shaft 23 has struck the then upright member of the catch 33. As it strikes this portion of the catch the catch is turned over and reset when the said auxiliary shaft in the initial position. As the shaft 23 is pulled forwardly, the rollers 17 and 18 travel up the guide ways and assume the original position. Once the catch has been reset in the initial position the actuating fender is slid back on the guide rods.

What I claim as my invention is:—

1. The combination of a main rectangular frame with a main cross shaft movable in a vertical direction between guide ways presented by the frame, hangers mounted on the cross shaft, auxiliary cross shafts carried by the hangers, a guard fending frame suspended from one of the auxiliary shafts, an actuating frame connected to the other of the auxiliary shafts and means for releasably locking the latter auxiliary shaft to the main frame, as and for the purpose specified.

2. The combination of a main rectangular frame presenting a pair of vertically disposed guide ways, with a main cross shaft having the ends thereof received within the guide ways, hangers mounted on the cross shaft and in the nature of bell cranks presenting long and short arms, an auxiliary cross shaft carried by the long arms of the hangers, an auxiliary cross shaft carried by the short arms of the hangers, a guard fending frame suspended from the latter auxiliary shaft, a normally advanced actuating frame connected with the former auxiliary cross shaft and releasable means for normally locking the former auxiliary shaft to the main frame in the advanced position of the actuating frame, as and for the purpose specified.

3. The combination of a main rectangular frame, presenting a pair of vertically disposed guide ways, with a main cross shaft having the ends thereof received within the guide ways, hangers mounted on the cross shaft and in the nature of bell cranks presenting long and short arms, an auxiliary cross shaft carried by the long arms of the hangers, an auxiliary cross shaft carried by the short arms of the hangers, a guard fending frame suspended from the latter auxiliary shaft, rods extending forwardly from the former auxiliary shaft, a normally advanced actuating fender provided with rearwardly extending tubes receiving the rods slidably, said tubes resting on the main frame and means for normally locking the former auxiliary shaft to the main frame in the advanced position of the actuating frame, as and for the purpose specified.

4. The combination of a main rectangular frame, presenting a pair of vertically disposed guide ways, with a main cross shaft having the ends thereof received within the guide ways, hangers mounted on the cross shaft and in the nature of bell cranks presenting long and short arms, an auxiliary cross shaft carried by the long arms of the hangers, an auxiliary cross shaft carried by the short arms of the hangers, a guard fending frame suspended from the latter auxiliary shaft, slotted rods extending forwardly from the former auxiliary shaft, a normally advanced actuating frame provided with rearwardly extending tubes receiving the rods slidably, said tubes resting on the main frame, pins carried by the tubes and entering the slots and a spring controlled catch piece carried by the main frame and normally engaging with and locking the former cross shaft to the main frame in the advanced position of the actuating frame, as and for the purpose specified.

Signed at Winnipeg this 1st day of April, 1914.

JACOB KWIATKOWSKI.

In the presence of—
G. S. ROXBURGH,
S. SILVERT.

Copies of this patent may be obtained for five cents each, by addressing the "Commissioner of Patents, Washington, D. C."